United States Patent
Rajkotia et al.

(10) Patent No.: US 8,059,590 B2
(45) Date of Patent: Nov. 15, 2011

(54) BANDWIDTH ALLOCATION AND SOFT HANDOFF IN MULTI-HOP CELLULAR COMMUNICATION NETWORKS

(75) Inventors: Purva R. Rajkotia, Iselin, NJ (US); Changhoi Koo, Plano, TX (US); William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 11/534,050

(22) Filed: Sep. 21, 2006

(65) Prior Publication Data

US 2007/0133500 A1 Jun. 14, 2007

Related U.S. Application Data

(60) Provisional application No. 60/748,725, filed on Dec. 9, 2005.

(51) Int. Cl.
 *H04B 3/36* (2006.01)
(52) U.S. Cl. .......................... 370/329; 340/425.1; 379/238; 370/322
(58) Field of Classification Search .............. 370/376, 370/395.41; 455/7
See application file for complete search history.

(56) References Cited

U.S. PATENT DOCUMENTS

| 6,505,043 | B1 | 1/2003 | Aihara | |
|---|---|---|---|---|
| 7,519,029 | B2 | 4/2009 | Takeda et al. | |
| 2003/0032427 | A1* | 2/2003 | Walsh et al. | 455/428 |
| 2004/0193728 | A1* | 9/2004 | Doshi et al. | 709/238 |
| 2005/0074019 | A1* | 4/2005 | Handforth et al. | 370/406 |

FOREIGN PATENT DOCUMENTS

| KR | 1020000077329 A | 12/2000 |
|---|---|---|
| KR | 1020030057467 A | 7/2003 |

* cited by examiner

*Primary Examiner* — Lester Kincaid
*Assistant Examiner* — Joshua Schwartz

(57) ABSTRACT

Methods and systems for allocating bandwidth and performing soft handoffs in multi-hop cellular communication networks are disclosed. For example, a method for allocating bandwidth is disclosed, which includes the steps of a first communication device transmitting a first bandwidth allocation request, responsive to receipt of the first bandwidth allocation request, a second communication device transmitting a first bandwidth allocation value, responsive to receipt of the first bandwidth allocation request, a third communication device transmitting a second bandwidth allocation value, the first communication device comparing the first bandwidth allocation value with the second bandwidth allocation value, a fourth communication device transmitting a third bandwidth allocation request, and responsive to receipt of the third bandwidth allocation request and the comparing step, the first communication device transmitting a third bandwidth allocation value, the third bandwidth allocation value including at least one of the first bandwidth allocation value and the second allocation value.

20 Claims, 3 Drawing Sheets ately allocation value, responsible to receipt of the first

BANDWIDTH ALLOCATION AND SOFT HANDOFF IN MULTI-HOP CELLULAR COMMUNICATION NETWORKS

CROSS-REFERENCE TO RELATED APPLICATION AND CLAIM FOR PRIORITY

The present application is related to U.S. Provisional Patent Application No. 60/748,725, entitled "BANDWIDTH ALLOCATION MECHANISM IN THE MULTIHOP CELLULAR NETWORKS," filed on Dec. 9, 2005, which is assigned to the assignee of the present application. The subject matter disclosed in U.S. Provisional Patent Application No. 60/748,725 is incorporated by reference into the present application as if fully set forth herein. The present application hereby claims priority, under 35 U.S.C. §119(e), to U.S. Provisional Patent Application No. 60/748,725.

FIELD OF THE INVENTION

The invention relates to the telecommunications field, and more particularly, but not exclusively, to a system and method for bandwidth allocation and soft handoff in multi-hop cellular communication networks.

BACKGROUND OF THE INVENTION

In conventional cellular communication networks, a fixed base station (BS) is responsible for controlling communications with the mobile stations (MSs) within the coverage area of that BS. The BS maintains control by selecting channels and communicating directly with the MSs. Thus, conventional cellular communication networks are considered single hop networks.

The limitations of single hop cellular networks are known. For example, the coverage of single hop cellular networks is limited by radio "dead spots" caused by interference from structures (e.g., buildings, etc.) located in the paths of the radiated signals. Also, the coverage of these networks is limited by the transmit power of the MSs. Significant increases in MS transmit power in single hop cellular networks increases signal interference, which decreases network capacity and throughput as a result.

Additionally, in code division multiple access (CDMA) single hop cellular networks, other limitations are known. For example, in single hop cellular networks operated in accordance with the IS-95 or CDMA2000 standards, each MS can be connected to multiple BSs simultaneously. Consequently, in CDMA single hop cellular networks, so-called "soft handoffs" occur whereby multiple BSs (and/or sectors) maintain their connections with an MS until after a handoff is completed. Thus, soft handoffs are described as "make before break" handoffs.

In the reverse links of conventional CDMA single hop cellular networks, each MS is required to set up the respective connections with the multiple BSs and/or sectors involved. Consequently, in order to perform soft handoffs in CDMA single hop cellular networks, a substantial amount of processing complexity is built into each MS, which significantly increases the technical complexity and expense of each mobile handset or device used.

In order to resolve the problems encountered with conventional signal hop cellular networks, standards that support multi-hop cellular communications have been approved. For example, IEEE Standard 802.16-2004 (formerly known as IEEE Standard 802.16d) for local and metropolitan area networks specifies the air interface for fixed broadband wireless access (BWA) systems supporting multimedia services. The medium access control (MAC) layer specified in Standard 802.16-2004 supports the use of point-to-multipoint architectures and mesh topologies. Using a mesh topology, a source node in a mesh network can communicate with a destination node via one or more intermediate nodes, and network control is distributed or decentralized. Thus, in the context of a cellular network using a mesh topology, a BS in a multi-hop cellular network can communicate with an MS via one or more fixed or mobile (intermediate) relay stations.

The advantages of multi-hop cellular networks over single hop cellular networks are known. For example, in multi-hop cellular networks, a BS can communicate indirectly with an MS via an intermediate relay station. Consequently, by providing alternate propagation paths, the effects of radio "dead spots" in these networks can be reduced. Also, because intermediate mobile or fixed relay stations can be used in multi-hop cellular networks, the transmit power of the individual MSs in these networks can be reduced. As a result, signal interference in multi-hop cellular networks can be reduced, which increases network capacity and throughput.

Although standards and protocols have been approved that support the use of multi-hop cellular communication networks, a number of important technical problems need to be resolved before such networks can be implemented. For example, in order to implement a multi-hop cellular network successfully, suitable bandwidth allocation mechanisms have to be developed with distributed access and control network objectives in mind. Also, suitable soft handoff mechanisms have to be developed for CDMA multi-hop cellular networks, which will reduce the technical complexity and expense of the mobile cellular communication devices involved.

SUMMARY OF THE INVENTION

In one embodiment, the present invention provides a method for allocating bandwidth in a multi-hop communication network. The method includes the steps of a first communication device transmitting a first bandwidth allocation request, responsive to receipt of the first bandwidth allocation request, a second communication device transmitting a first bandwidth allocation value, responsive to receipt of the first bandwidth allocation request, a third communication device transmitting a second bandwidth allocation value, the first communication device comparing the first bandwidth allocation value with the second bandwidth allocation value, a fourth communication device transmitting a third bandwidth allocation request, and responsive to receipt of the third bandwidth allocation request and the comparing step, the first communication device transmitting a third bandwidth allocation value, the third bandwidth allocation value including at least one of the first bandwidth allocation value and the second allocation value.

In a second embodiment, the present invention provides a method for performing a soft handoff in a multi-hop cellular communication network. The method includes the steps of a relay station communicating with a first base station and a second base station, a mobile station communicating with the first base station through the relay station, the mobile station receiving a reference signal from the second base station and transmitting data to the relay station, the data including information associated with the reference signal, the relay station transmitting a handoff request message, responsive to receipt of the handoff request message, the second base station transmitting an acceptance message, responsive to receipt of the acceptance message, the relay station combining traffic data received from the first base station and the second base station, and transmitting the combined traffic data.

In a third embodiment, the present invention provides a system for allocating bandwidth in a multi-hop communication network. The system includes a first communication device operable to transmit a first bandwidth allocation request, a second communication device operable to transmit a first bandwidth allocation value responsive to receipt of the first bandwidth allocation request, a third communication device operable to transmit a second bandwidth allocation value responsive to receipt of the first bandwidth allocation request, the first communication device further operable to compare the first bandwidth allocation value with the second bandwidth allocation value, a fourth communication device operable to transmit a third bandwidth allocation request, and responsive to receipt of the third bandwidth allocation request, the first communication device further operable to transmit a third bandwidth allocation value, the third bandwidth allocation value including at least one of the first bandwidth allocation value and the second allocation value.

In a fourth embodiment, the present invention provides a system for performing a soft handoff in a multi-hop cellular communication network. The system includes a relay station operable to communicate with a first base station and a second base station, a mobile station operable to communicate with the first base station through the relay station, receive a reference signal from the second base station, and transmit data to the relay station, the data including information associated with the reference signal, the relay station further operable to transmit a handoff request message, responsive to receipt of the handoff request message, the second base station is operable to transmit an acceptance message, and responsive to receipt of the acceptance message, the relay station further operable to combine traffic data received from the first base station and the second base station, and transmit the combined traffic data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
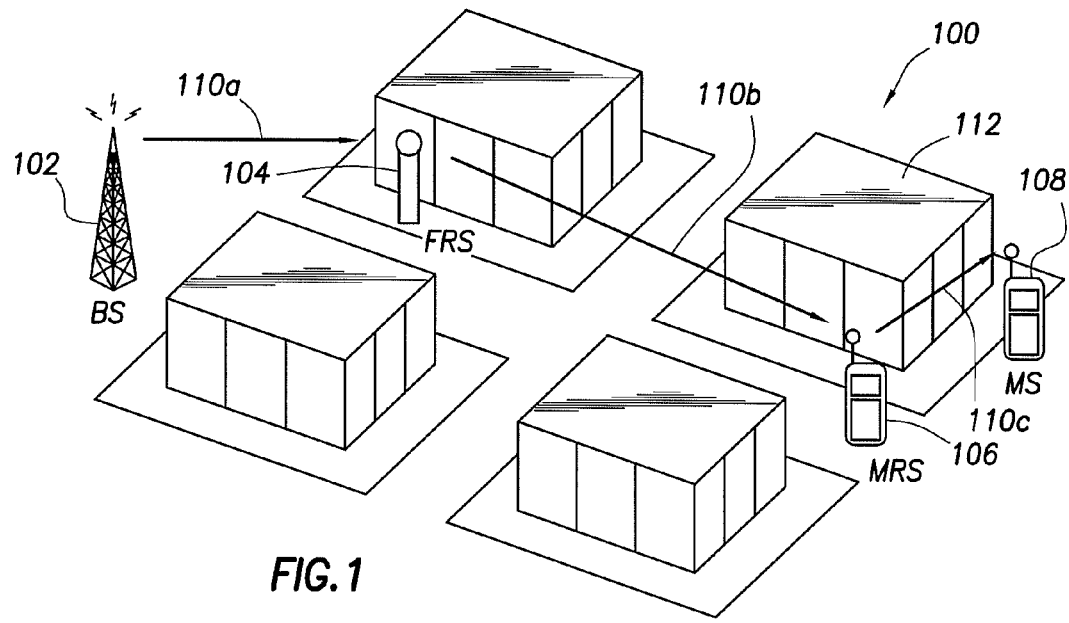
FIG. 1 is a simplified block diagram, which illustrates coverage in a multi-hop cellular network, in accordance with an example embodiment of the present invention.

With reference now to the figures, FIG. 1 is a simplified block diagram 100, which illustrates coverage in a multi-hop cellular network, in accordance with an example embodiment of the present invention. For this illustrative example, diagram 100 depicts a portion of a multi-hop cellular network, which includes a BS 102, a fixed relay station (FRS) 104, a mobile relay station (MRS) 106, and an MS 108. For example, the multi-hop cellular network depicted in FIG. 1 may be implemented in accordance with IEEE Standard 802.16-2004. BS 102 is shown communicating with MS 108 on a downlink via three link segments 110a through 110c (e.g., multiple links or multi-hops). For example, link segment 110a may be implemented with a wireline connection between BS 102 and FRS 104, and link segments 110b and 110c may be implemented as wireless connections between FRS 104 and MRS 106, and MRS 106 and MS 108, respectively. Note that the multi-hop, indirect routing of signals from BS 102 to MS 108 avoids a potential radio "dead spot" caused by the structure (e.g., building) 112 shown.

For illustrative purposes and clarity, only one BS and MS is depicted in the example network portion shown in FIG. 1. In practice, however, a complete multi-hop cellular network may include a plurality of BSs, and each BS may communicate with a plurality of MSs via a plurality of multi-hop downlinks and uplinks. Also, a fixed RS 104 and wireline link 110a to BS 102 are depicted in this illustrative example. However, in a different embodiment, a mobile or "nomadic" RS (NRS) and a wireless link to BS 102 may be used instead of FRS 104 and wireline link 110a. As such, the NRS may perform functionally similar to that of an FRS but in a mobile context. In yet another embodiment, an uplink or downlink path between a BS and an MS may include only an FRS (e.g., no MRS), only an MRS (e.g., no FRS), or multiple MRSs.

Figure 2:
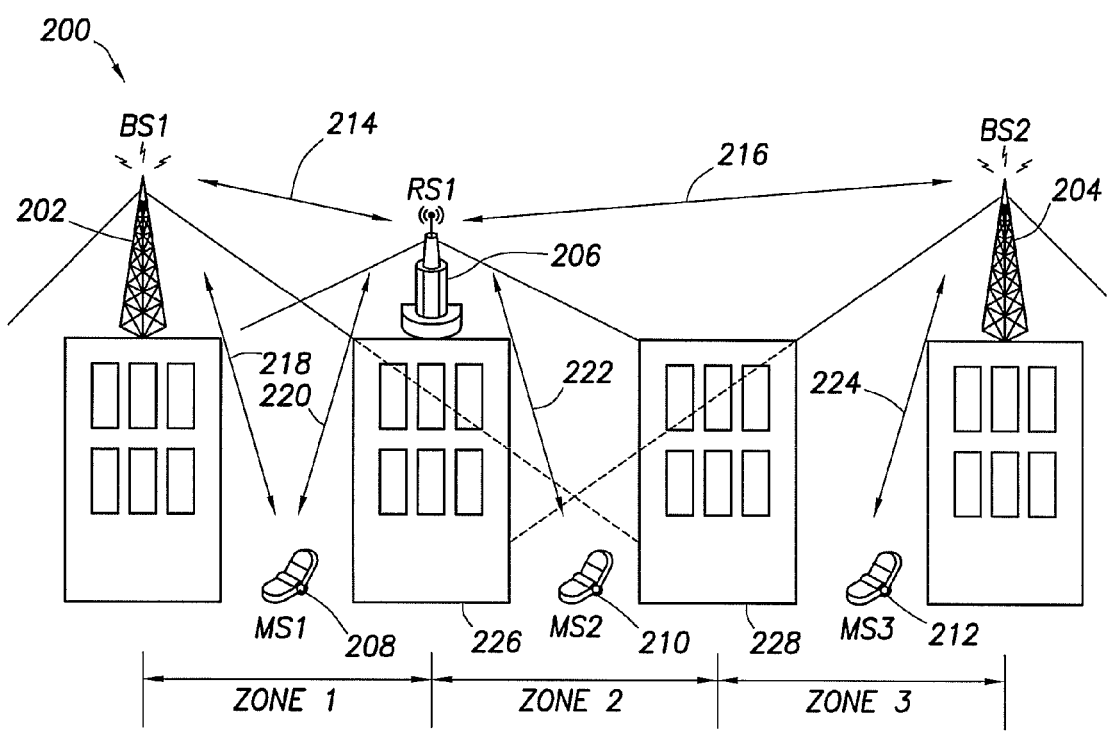
FIG. 2 is a simplified block diagram, which further illustrates coverage in a multi-hop cellular network, in accordance with an example embodiment of the present invention.

FIG. 2 is a simplified block diagram 200, which further illustrates coverage in a multi-hop cellular network, in accordance with an example embodiment of the present invention. For this illustrative example, diagram 200 provides a more generic illustration of cell configuration and planning in a multi-hop cellular network than the example multi-hop cellular network shown in FIG. 1. As such, the multi-hop cellular network depicted in FIG. 2 includes a first BS 202, a second BS 204, a relay station (RS) 206, and a plurality of MSs 208, 210 and 212. Similar to the multi-hop cellular network depicted in FIG. 1, the multi-hop cellular network depicted in FIG. 2 may be implemented in accordance with IEEE Standard 802.16-2004. Also, for this example embodiment, RS 206 is implemented with an FRS. However, in a different embodiment, RS 206 may be implemented with a suitable MRS, NRS or similar device.

For this illustrative embodiment, BS 202 is shown communicating with RS 206 via a communication link 214, and BS 204 is shown communicating with RS 206 via a communication link 216. BS 202 is also shown communicating (directly) with MS 208 via a communication link 218. Additionally, RS 206 is shown communicating (directly) with MS 208 via a first communication link 220, and also with MS 210 via a second communication link 222. BS 204 is also shown communicating (directly) with MS 212 via a communication link 224. Furthermore, BS 202 is shown communicating (indirectly) with MS 210 via multi-hop links 214 and 222, and BS 204 is shown communicating (indirectly) with MS 210 via multi-hop links 216 and 222. For this example embodiment, communication links 214 and 216 may be implemented with wireline or wireless connections between RS 206 and BSs 202 and 204, respectively. Also, for this example, communication links 218, 220, 222 and 224 may be implemented with wireless connections. Note that the multi-hop, indirect routing of signals from BS 202 and BS 204 to MS 210 via RS 206 avoids potential radio "dead spots" caused by the structures (e.g., buildings) 226 and 228 shown.

Figure 3:
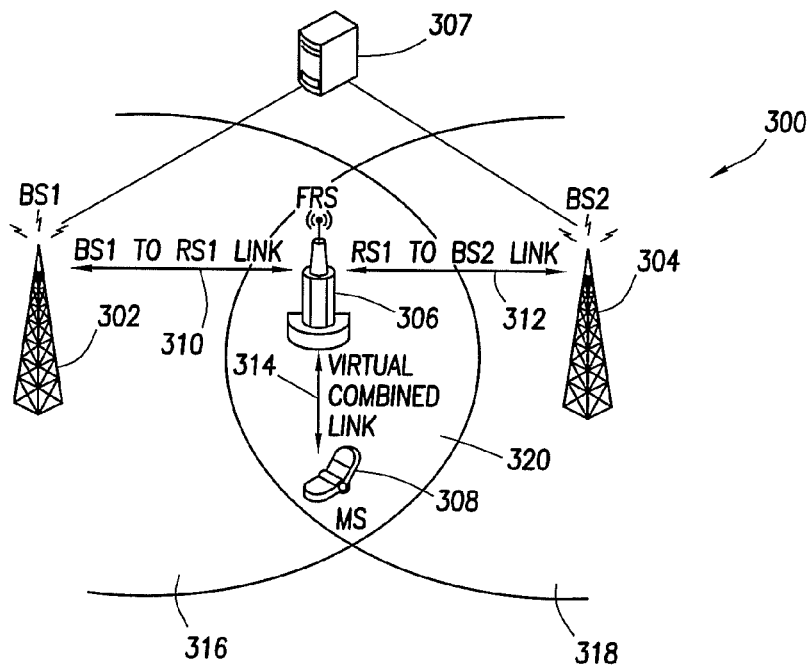
FIG. 3 is a simplified block diagram of an example configuration for a multi-hop cellular network, which can be used to implement an embodiment of the present invention.

FIG. 3 is a simplified block diagram of an example configuration for a multi-hop cellular network 300, which can be used to implement an embodiment of the present invention. For this illustrative embodiment, multi-hop cellular network 300 includes two BSs 302 and 304 and an FRS 306. BS 302 is connected for communications with FRS 306 via a first communication link 310, and BS 304 is connected for communications with FRS 306 via a second communication link 312. FRS 306 is connected for communications with an MS 308 via a third communication link 314. A network controller (e.g., server or suitable computer processing device) 307 is connected to each BS 302 and 304, in order to control the access and communication functions of the BSs and MSs involved.

Note that for illustrative purposes and clarity, only two BSs, one FRS, and one MS are depicted in the example network shown in FIG. 3. However, a complete multi-hop cellular network may include more than two BSs, and each BS may communicate with a plurality of MSs via one or more RSs (e.g., FRSs, MRSs, and/or NRSs) over a plurality of multi-hop communication links. Also, communication links 310 and 312 may be implemented with wireline or wireless links.

As illustrated by the example multi-hop cellular network configuration shown in FIG. 3, an RS (e.g., FRS 306 in this example) can maintain multiple connections with each BS (e.g., 302 and 304), and simultaneously communicate with an MS (e.g., 308) within the cell boundaries of the multiple BSs. For example, BS 302 is shown having a first coverage region (e.g., cell and/or sector) 316, BS 304 is shown having a second coverage region (e.g., cell and/or sector) 318, and MS 308 is located within the overlapping coverage region 320. Thus, as far as each BS 302, 304 is concerned, the RS 306 appears to be just another MS located within the coverage region of the respective cell or sector involved. Consequently, because the RS has to share its bandwidth with all of the MSs located within a cell or sector, the RS requires a much larger amount of bandwidth than that typically required by an MS. Also, since the RS may be considered to be an MS by each BS, in certain circumstances, a BS may allocate zero bandwidth to an RS. Consequently, in those circumstances, that RS would be unable to support communications. As such, in order to allocate bandwidth successfully to an RS within a multi-hop cellular network, the bandwidth requests made by the MS and the bandwidth allocated by the BS both have to be considered in the allocation process.

Figure 4:
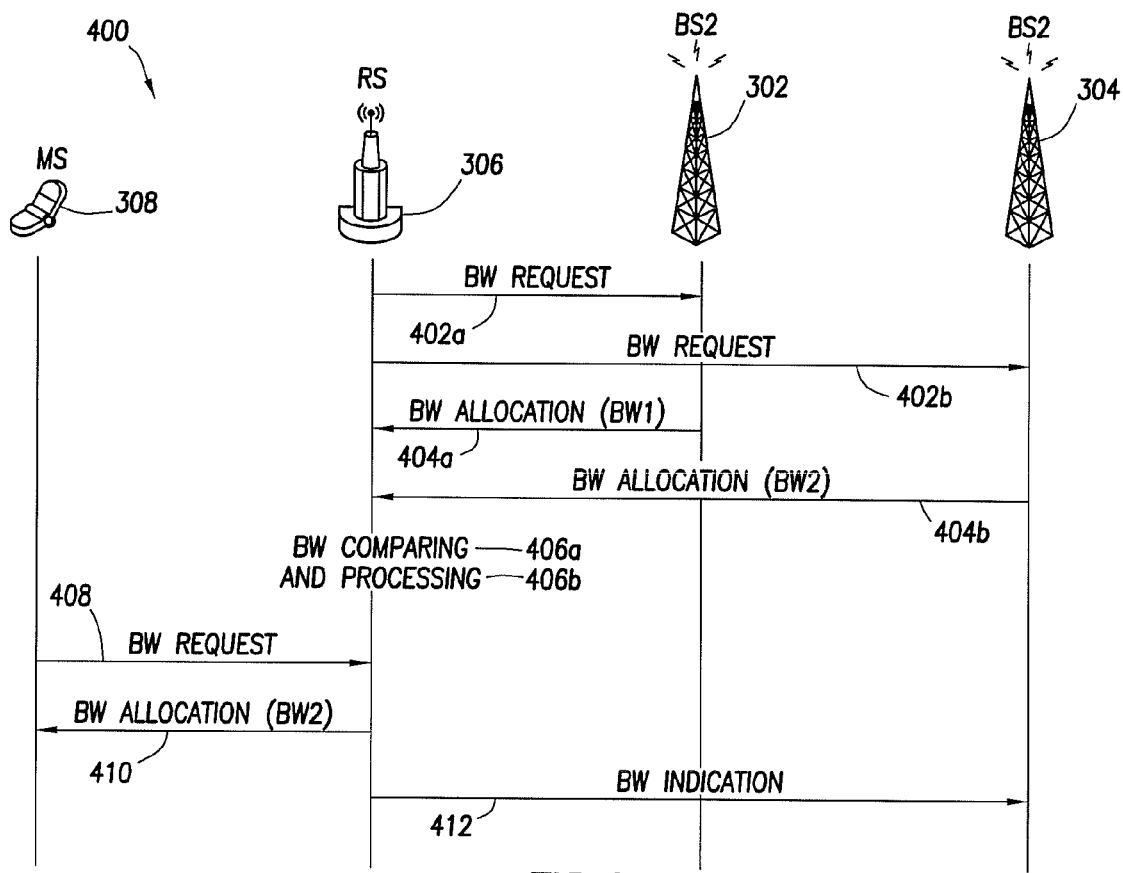
FIG. 4 is a call flow diagram that depicts a method for allocating bandwidth in a multi-hop cellular network, which can be used to implement an example embodiment of the present invention.

FIG. 4 is a call flow (time sequence) diagram that depicts a method 400 for allocating bandwidth in a multi-hop cellular network, which can be used to implement an example embodiment of the present invention. For explanatory purposes in this illustrative example, method 400 is described in conjunction with multi-hop cellular network configuration 300 shown in FIG. 3. However, the present invention is not intended to be so limited, and method 400 may be performed in conjunction with any suitable multi-hop cellular network that includes a plurality of BSs, at least one RS, a plurality of MSs, and/or any other communication devices that perform functions similar to those of a BS, RS, and/or MS.

Essentially, as illustrated by the network configuration 300 shown in FIG. 3, the bandwidth allocation mechanisms needed for multi-hop cellular networks are relatively complex and critical to network operations. For example, MS 308 is shown connected for communications with FRS 306, but each link between MS 308 and the two BSs 302 and 304 (via the RS) may have a different capacity than the other, because each link takes a different path and experiences a different multi-path effect. Consequently, if the RS allocates an amount of bandwidth to an MS that is not supported by a particular BS, then that bandwidth allocation may be effectively disrupted since the link between the RS and that unsupportive BS would provide a communication bottleneck. Therefore, in order to effectively allocate bandwidth in a multi-hop cellular network, very close allocation interaction is required between the RS (e.g., FRS 306) and the BSs (e.g., 302, 304) involved. In one example embodiment, as described in detail below, method 400 provides a technique that enables an RS to quickly vary the total bandwidth available from multiple BSs and thus allocate bandwidth effectively in multi-hop cellular networks.

Referring now to FIGS. 3 and 4 for this example embodiment, method 400 begins with an RS (e.g., FRS 306) transmitting a bandwidth allocation request message to two BSs (e.g., BS 302, BS 304) having overlapping cell/sector coverage in a multi-hop cellular network (steps 402a, 402b). In response, each BS may allocate a total amount of bandwidth for the RS. In determining the total amount of bandwidth to allocate for the RS, each BS may consider the amount of bandwidth needed for the RS, plus the amount of available bandwidth needed for the MSs located within that BS's cell (and/or sector). Next, each BS transmits a bandwidth allocation message to the RS, which allocates to the RS the amount of total bandwidth the respective BS has determined is needed for the RS (steps 404a, 404b). For this example embodiment, one BS (e.g., BS 302) transmits a message that allocates one amount of bandwidth (BW 1) to the RS (e.g., FRS 306), and the second BS (e.g., BS 304) transmits a message that allocates a second amount of bandwidth (BW 2) to the RS.

Next, the RS compares the allocated amounts of bandwidth (BW 1, BW 2) from the two BSs (step 406a). The RS then allocates an amount of bandwidth for the MSs located in the overlapping coverage region, and that allocation is based on one of the allocated amounts (BW 1 or BW 2) from the two BSs (step 406b). For example, the RS may select one of the two bandwidth amounts (BW 1 or BW 2) to allocate for each MS involved. Alternatively, the RS may allocate a different amount of bandwidth to each MS located in the cell/sector of a BS. In other words, the RS controls the allocation of bandwidth to each MS located within the two BSs' cells/sectors and the overlapping coverage region 320.

An MS located within the overlapping coverage region then transmits a bandwidth allocation request message to the RS (step 408). In response, the RS transmits a bandwidth allocation message to that MS, which allocates a suitable amount of bandwidth for that MS (step 410). For this example embodiment, the RS 306 may allocate the bandwidth amount BW 2 (from BS 306) for MS 308. Next, the RS transmits a bandwidth allocation indication message to BS 306, which informs the BS that the RS has allocated bandwidth for that MS (step 412).

Figure 5:
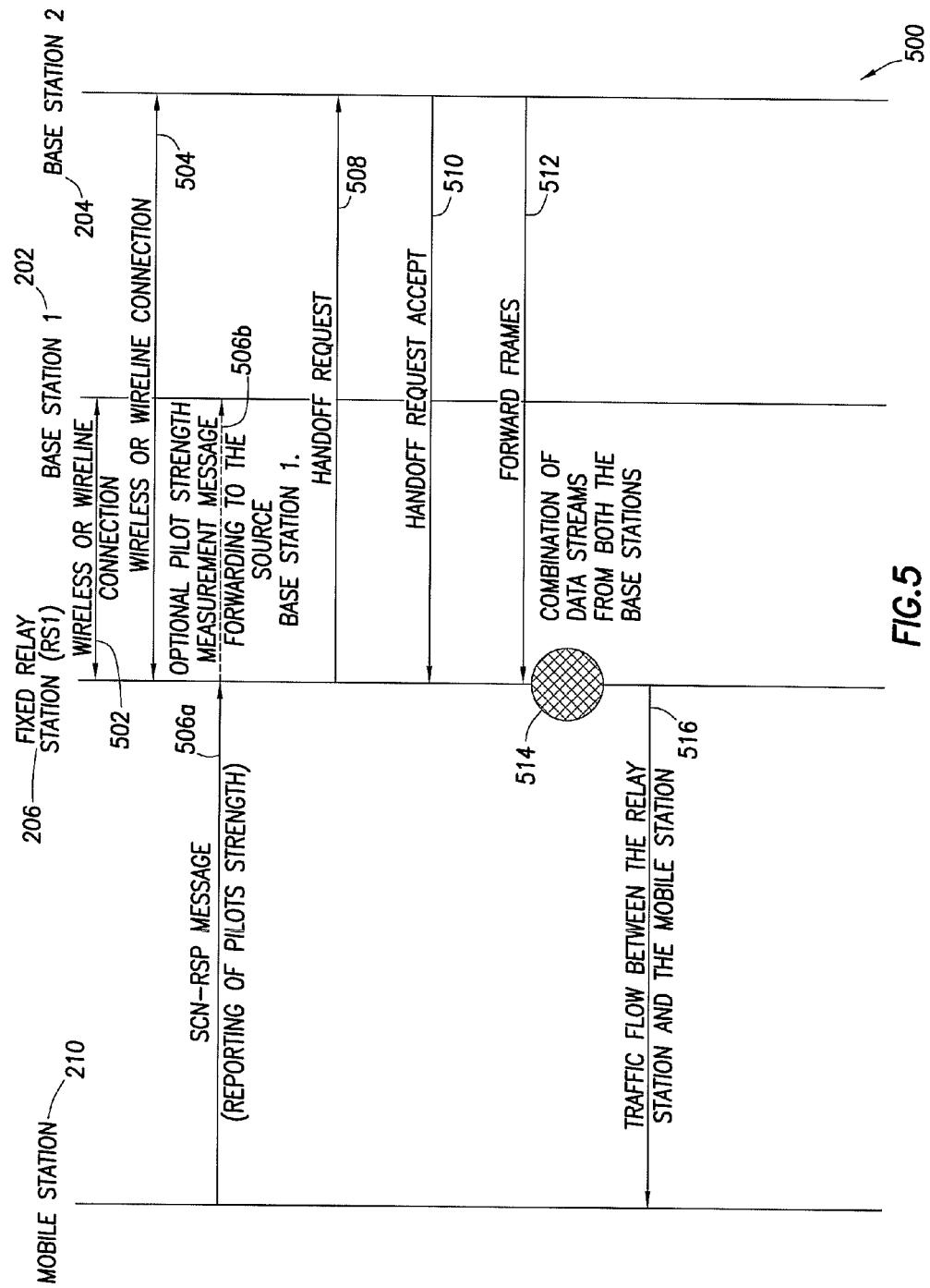
FIG. 5 is a call flow diagram that depicts a method for performing soft handoffs in a multi-hop cellular network, which can be used to implement an example embodiment of the present invention.

FIG. 5 is a call flow (time sequence) diagram that depicts a method 500 for performing soft handoffs in a multi-hop cellular network, which can be used to implement an example embodiment of the present invention. For explanatory purposes in this illustrative example, method 500 is described in conjunction with multi-hop cellular network configuration 200 shown in FIG. 2. Also, for this example, the illustrative multi-hop cellular network shown in FIG. 2 may be operated in accordance with a suitable CDMA radio air interface standard or protocol (e.g., IS-95, CDMA2000, or a similar standard). However, the present invention is not intended to be so limited, and the soft handoff method described by method 500 may be performed in conjunction with any suitable multihop cellular network standard or protocol, which can be implemented with a plurality of BSs, at least one RS, a plurality of MSs, and/or any communication devices that perform functions similar to those of a BS, RS, and/or MS.

Essentially, in accordance with one embodiment, method 500 describes a virtual soft handoff mechanism for multi-hop cellular networks. An RS combines the soft handoff links (or legs) from the multiple BSs, and delivers the combined soft handoff leg to the MS involved. Thus, in this manner, the hardware and software complexities associated with soft handoffs may be built into the RS, which significantly reduces the complexity and expense of the MSs involved.

Referring first to FIG. 2 for this illustrative embodiment, MS 210 is shown located in Zone 2, and thus has no direct communication link with either BS 202 or BS 204. However, in multi-path network 200, MS 210 can communicate with (or see) BS 202 via RS 206 and links 222 and 214. Also, MS 210 can communicate with BS 204 via RS 206 and links 222 and 216. Notably, using a conventional soft handoff technique, the MS would have performed the soft handoff procedure by combining the direct links between itself and the two BSs involved. However, method 500 describes a virtual soft handoff approach for multi-hop cellular networks, which enables an RS to combine the respective legs between an MS and each BS involved.

Referring now to FIGS. 2 and 5 for this example embodiment, method 500 begins with a first BS (e.g., 202) making a wireless or wireline connection with RS 206 (step 502), and a second BS (e.g., 204) also making a wireless or wireline connection with RS 206 (step 504). For this illustrative example, assume that BS 202 is the source BS for the soft handoff procedure, and BS 204 is the new or target BS. Also assume that MS 210 receives and detects a second pilot signal in its active set, and the second pilot signal is from the target BS 204. If MS 210 determines that a value of the second pilot signal is above a predetermined threshold level, a virtual soft handoff procedure may begin. For example, the predetermined threshold level value may be power based, distance based, velocity based, or a combination of those or similar soft handoff decision parameters.

In response to a determination that the second pilot signal is greater than or equal to the predetermined threshold level, MS 210 transmits a Scanning Response Message (e.g., SCN-RSP) to the nearest RS (e.g., RS 206 in this case), and reports the strength of the second pilot signal to that RS (step 506a). As an option, RS 206 may forward the pilot signal strength information in a suitable message to the source BS 202 (step 506b). Also, instead of transmitting the SCN-RSP message automatically to RS 206, MS 210 may transmit the SCN-RSP message in response to the receipt of a scanning request message from the target BS 204.

Next, RS 206 transmits a handoff request message to BS 204 (step 508), and BS 204 responds by transmitting a handoff request accept message to RS 206 (step 510). Also, target BS 204 transmits suitable communication frames to RS 206, and thus a traffic link is established between BS 204 and RS 206 (step 512). As such, RS 206 now has a respective traffic link established with the source BS 202 and the target BS 204. As a result, RS 206 serves as a communication gateway to the two BSs 202 and 204.

Once the traffic link with the target BS 204 is established, RS 206 combines the traffic link data from the source BS 202 and the target BS 204 (step 514). RS 206 then transmits the combined traffic link data (e.g., virtual soft handoff link or leg) to MS 210 (step 516). Consequently, from the standpoint of that MS, by having the RS combine and forward the two traffic links, the RS has completed a soft handoff procedure without having the MS significantly involved. An illustrative example of such a combined traffic link (e.g., virtual soft handoff link) is shown as element 314 in the multi-hop cellular network in FIG. 3. Subsequent to the completion of the virtual soft handoff procedure, MS 210 monitors the combined traffic link received from RS 206. If MS 210 determines that a substantive change has occurred with respect to its active set, then MS 210 can report that change to RS 206, which in turn can determine whether or not to add or drop a traffic link (e.g., begin or terminate a soft handoff procedure).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for allocating bandwidth at a relay station in a multi-hop cellular communication network, comprising the steps of:
   transmitting a first bandwidth allocation request from the relay station to at least a first base station and a second base station;
   receiving, at the relay station, a first bandwidth allocation value from the first base station in response to the first bandwidth allocation request;
   receiving, at the relay station, a second bandwidth allocation value from the second base station in response to the first bandwidth allocation request;
   comparing, by the relay station, the first bandwidth allocation value with the second bandwidth allocation value;
   receiving, at the relay station, a second bandwidth allocation request from a mobile station; and
   responsive to receipt of the second bandwidth allocation request and the comparing step, transmitting a third bandwidth allocation value from the relay station to at least the mobile station, the third bandwidth allocation value including at least one of the first bandwidth allocation value and the second bandwidth allocation value.

2. The method of claim 1, wherein the multi-hop cellular communication network comprises a code division multiple access (CDMA) multi-hop cellular communication network.

3. The method of claim 1, wherein the relay station is located in a region where a coverage area of the first base station and a coverage area of the second base station overlap.

4. The method of claim 1, wherein the comparing step further comprises a step of comparing the first bandwidth allocation value and the second bandwidth allocation value to the second bandwidth allocation request.

5. The method of claim 1, wherein the comparing step comprises a step of comparing the first bandwidth allocation value and the second bandwidth allocation with a predetermined value, and if at least one bandwidth allocation value of the first bandwidth allocation value and the second bandwidth allocation value is greater than or equal to the predetermined value, selecting the at least one bandwidth allocation value for the third bandwidth allocation value.

6. The method of claim 1, wherein the comparing step further comprises a step of comparing the first bandwidth allocation value with the second bandwidth allocation value, and if the first bandwidth allocation value is greater than or equal to the second bandwidth allocation value, selecting the first bandwidth allocation value for the third bandwidth allocation value.

7. The method of claim 6, further comprising, responsive to selecting the first bandwidth allocation value for the third bandwidth allocation value, the relay station transmitting a bandwidth allocation indication to the first base station.

8. A multi-hop cellular communication network, comprising:
   a relay station operable to transmit a first bandwidth allocation request to at least a first base station and a second base station;
   the first base station operable to transmit a first bandwidth allocation value to the relay station responsive to receipt of the first bandwidth allocation request;
   the second base station operable to transmit a second bandwidth allocation value to the relay station responsive to receipt of the first bandwidth allocation request;
   the relay station further operable to:
   compare the first bandwidth allocation value with the second bandwidth allocation value;
   receive a second bandwidth allocation request from a mobile station; and
   responsive to receipt of the second bandwidth allocation request, transmit a third bandwidth allocation value to at least the mobile station, the third bandwidth allocation value including at least one of the first bandwidth allocation value and the second bandwidth allocation value.

9. The multi-hop cellular communication network of claim 8, wherein the relay station is located in a region where a coverage area of the first base station and a coverage area of the second base station overlap.

10. The multi-hop cellular communication network of claim 8, wherein the relay station comprises at least one of a fixed relay station, a mobile relay station, and a nomadic relay station.

11. The multi-hop cellular communication network of claim 8, wherein the relay station is further operable to compare the first bandwidth allocation value and the second bandwidth allocation value to the second bandwidth allocation request.

12. The multi-hop cellular communication network of claim 8, wherein the relay station is further operable to:
   compare the first bandwidth allocation value and the second bandwidth allocation with a predetermined value; and
   if at least one bandwidth allocation value of the first bandwidth allocation value and the second bandwidth allocation value is greater than or equal to the predetermined value, select the at least one bandwidth allocation value for the third bandwidth allocation value.

13. The multi-hop cellular communication network of claim 8, wherein the relay station is further operable to:
   compare the first bandwidth allocation value with the second bandwidth allocation value; and
   if the first bandwidth allocation value is greater than or equal to the second bandwidth allocation value, select the first bandwidth allocation value for the third bandwidth allocation value.

14. The multi-hop cellular communication network of claim 13, wherein, responsive to selecting the first bandwidth allocation value for the third bandwidth allocation value, the relay station is further operable to transmitting a bandwidth allocation indication to the first base station.

15. A relay station for use in a multi-hop cellular communication network, the relay station operable to:
   transmit a first bandwidth allocation request to at least a first base station and a second base station;
   receive a first bandwidth allocation value from the first base station in response to the first bandwidth allocation request;
   receive a second bandwidth allocation value from the second base station in response to the first bandwidth allocation request;
   compare the first bandwidth allocation value with the second bandwidth allocation value;
   receive a second bandwidth allocation request from a mobile station; and
   responsive to receipt of the second bandwidth allocation request and the comparing step, transmit a third bandwidth allocation value to at least the mobile station, the third bandwidth allocation value including at least one of the first bandwidth allocation value and the second allocation value.

16. The relay station of claim 15, wherein the relay station is located in a region where a coverage area of the first base station and a coverage area of the second base station overlap.

17. The relay station of claim 15, wherein the relay station is further operable to compare the first bandwidth allocation value and the second bandwidth allocation value to the second bandwidth allocation request.

18. The relay station of claim 15, wherein the relay station is further operable to:
   compare the first bandwidth allocation value and the second bandwidth allocation with a predetermined value; and
   if at least one bandwidth allocation value of the first bandwidth allocation value and the second bandwidth allocation value is greater than or equal to the predetermined value, select the at least one bandwidth allocation value for the third bandwidth allocation value.

19. The relay station of claim 15, wherein the relay station is further operable to:
   compare the first bandwidth allocation value with the second bandwidth allocation value; and
   if the first bandwidth allocation value is greater than or equal to the second bandwidth allocation value, select the first bandwidth allocation value for the third bandwidth allocation value.

20. The relay station of claim 19, wherein, responsive to selecting the first bandwidth allocation value for the third bandwidth allocation value, the relay station is further operable to transmitting a bandwidth allocation indication to the first base station.

* * * * *